United States Patent
Terry et al.

(10) Patent No.: US 9,353,713 B2
(45) Date of Patent: May 31, 2016

(54) FUEL WATER SEPARATOR FILTER WITH WATER DRAIN

(71) Applicant: CUMMINS FILTRATION IP, INC., Minneapolis, MN (US)

(72) Inventors: Brian J. Terry, Livingston, TN (US); Carey A. Curt, Cookeville, TN (US); Mark J. Johnson, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 348 days.

(21) Appl. No.: 13/715,003

(22) Filed: Dec. 14, 2012

(65) Prior Publication Data

US 2013/0153487 A1 Jun. 20, 2013

Related U.S. Application Data

(60) Provisional application No. 61/577,324, filed on Dec. 19, 2011.

(51) Int. Cl.

| | |
|---|---|
| *F02M 37/22* | (2006.01) |
| *B01D 36/00* | (2006.01) |
| *B01D 17/04* | (2006.01) |
| *B01D 27/14* | (2006.01) |
| *B01D 17/02* | (2006.01) |

(52) U.S. Cl.
CPC ........... *F02M 37/221* (2013.01); *B01D 36/005* (2013.01); *B01D 36/006* (2013.01); *B01D 17/0214* (2013.01); *B01D 17/045* (2013.01); *B01D 27/148* (2013.01)

(58) Field of Classification Search
None
See application file for complete search history.

(56) References Cited

U.S. PATENT DOCUMENTS

| | | | |
|---|---|---|---|
| 3,187,895 A * | 6/1965 | Pall et al. ................ | 210/114 |
| 4,427,542 A | 1/1984 | Glover | |
| 4,497,714 A * | 2/1985 | Harris ..................... | 210/788 |
| 4,740,299 A | 4/1988 | Popoff et al. | |
| 7,267,769 B2 | 9/2007 | Baird | |
| 7,614,504 B2 | 11/2009 | South et al. | |

(Continued)

FOREIGN PATENT DOCUMENTS

| | | |
|---|---|---|
| CN | 1379695 | 11/2002 |
| CN | 1138140 | 2/2004 |

(Continued)

OTHER PUBLICATIONS

International Search Report for international application No. PCT/US2012/070050, dated Apr. 22, 2013 (4 pages).

(Continued)

*Primary Examiner* — Terry Cecil
(74) *Attorney, Agent, or Firm* — Foley & Lardner LLP (57) ABSTRACT

A fuel water separator (FWS) filter that is configured to permit water to be drained from the water sump of the FWS filter without shutting off fuel flow to the FWS filter. A check valve is positioned between the water sump and the filter element. When the FWS filter is under vacuum (e.g. as in operation), the check valve can be closed to allow water to drain from the sump. The check valve can close automatically by floating on accumulated water in the sump until the water rises to a level where the check valve is closed. The check valve can also close by opening the drain valve of the FWS filter, which causes a differential pressure between the sump and the vacuum created in the filter element chamber, which forces the check valve to close.

22 Claims, 6 Drawing Sheets

(56) References Cited

U.S. PATENT DOCUMENTS

| | | |
|---|---|---|
| 7,882,961 B2 | 2/2011 | Menez et al. |
| 8,784,651 B2 * | 7/2014 | Moe .................. A61C 17/046 137/205 |
| 2006/0065601 A1 | 3/2006 | Baird |
| 2011/0168621 A1 | 7/2011 | Wieczorek et al. |

FOREIGN PATENT DOCUMENTS

| | | |
|---|---|---|
| CN | 101027114 | 8/2007 |
| EP | 0 260 069 | 3/1988 |
| EP | 0738528 | 10/1996 |
| WO | 01/34273 | 5/2001 |
| WO | WO-2006/043817 | 4/2006 |
| WO | WO 2006043817 A1 * | 4/2006 |

OTHER PUBLICATIONS

Written Opinion for international application No. PCT/US2012/070050, dated Apr. 22, 2013 (7 pages).

The First Office Action issued in Chinese Patent Application No. 201280057841.5, dated May 27, 2015.

* cited by examiner

FUEL WATER SEPARATOR FILTER WITH WATER DRAIN

FIELD

This disclosure relates generally to a fuel water separator (FWS) type filter that is configured to separate water from fuel being filtered, such as ultra-low sulfur diesel (ULSD) or biodiesel. In particular, this disclosure relates to a valve that is disposed between the water sump of the FWS filter and the filter element which allows water to be drained from the water sump during operation of the FWS filter without shutting off fuel flow.

BACKGROUND

In a typical FWS filter, when used under suction, the FWS cannot be drained of its water during operation. The vacuum that is created within the filter housing draws air through the drain valve, prohibiting the water from flowing out of the water sump of the FWS. To drain the water, current practices require shutting the engine down or diverting the fuel flow via manual valves to permit draining of the water.

A FWS filter that allows water to be drained from the water sump without shutting the engine down or diverting fuel flow (i.e. without shutting off fuel flow to the FWS filter) is desirable.

SUMMARY

This disclosure relates to a FWS filter that is configured to permit water to be drained from the water sump of the FWS filter without shutting off fuel flow to the FWS filter. Therefore, the filter can remain in operation while draining water from the sump.

The filter is preferably configured for use with fuel, such as ultra-low sulfur diesel (ULSD) or biodiesel. However, the concepts of the filter described herein could be employed with any type of filter which is used to separate water from a fluid, for example hydraulic fluid, oil or lubrication fluid, air, and the like, to permit the water to be drained from a sump while the filter remains in operation.

In the case of a FWS filter, a check valve is positioned between the water sump and the filter element. When the FWS filter is under vacuum (e.g. as in operation), the check valve can be closed to allow water to drain from the sump. The check valve can close automatically by floating on accumulated water in the sump until the water rises to a level where the check valve is closed. The check valve can also close by opening the drain valve of the FWS filter, which causes a differential pressure between the sump and the vacuum created in the filter element chamber, to cause the check valve to close.

One embodiment of a fuel water separator filter includes a filter housing defining a filter element chamber and a water sump, where the filter element chamber is separated from the water sump by a wall. A passageway is provided in the wall that fluidly connects the filter element chamber and the water sump. A valve controls flow through the fluid passageway, with the valve having a first, open position that permits fluid flow from the filter element chamber into the water sump and a second, closed position preventing fluid flow between the filter element chamber and the water sump. The filter housing further includes a drain valve in communication with the water sump to permit draining of water from the water sump.

The filter element that is disposed in the filter element chamber is configured to separate water from fuel. For example, the filter element can be a concentric filter within a filter configuration, with an outer stage filter that is configured to coalesce water from fuel, an inner stage filter that is surrounded by the outer stage filter, and a space between the outer stage filter and the inner stage filter. The inner stage filter is configured to separate coalesced water from the fuel and also remove fine solid contaminants from the fuel. The passageway in the wall is located at a position in communication with the space between the inner stage filter and the outer stage filter so that separated water flows down through the inner space and through the passageway and into the water sump.

DETAILED DESCRIPTION

Figure 1:
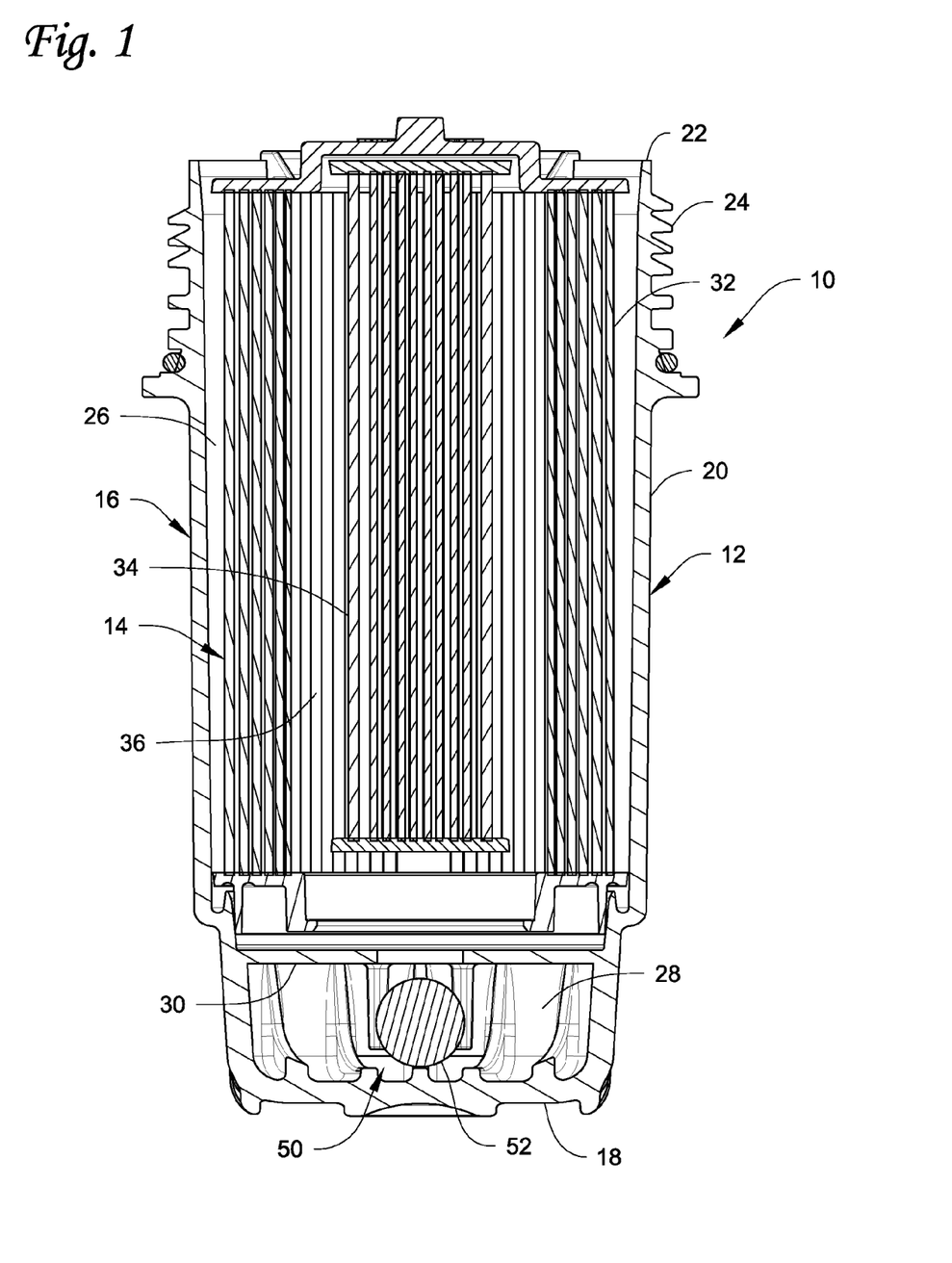
FIG. 1 is a cross-sectional view of the FWS filter described herein.

With reference initially to FIG. 1, an embodiment of a FWS filter 10 incorporating the water drain concepts described herein is illustrated. The FWS filter includes a filter housing 12 and a filter element 14. In the illustrated embodiment, the FWS filter 10 is configured as a spin-on filter that is configured for detachable connection to a filter mounting head (not shown). As used herein, the term spin-on refers to the use of rotation to effect connection and disconnection of the filter to and from the head.

The filter 10 will be described herein as being configured for use with fuel, such as ultra-low sulfur diesel (ULSD) or biodiesel. However, the concepts of the filter described herein could be employed with any type of filter which is used to separate water from a fluid, for example hydraulic fluid, oil or lubrication fluid, air, and the like, to permit the water to be drained from a sump while the filter remains in operation. In addition, the filter will be described as being configured for outside-in flow of the fuel where the fuel flows generally radially inward through the filter media to a central space and then out through a central outlet. However, the concepts described herein can also be employed on a filter that is configured for inside-out flow of fuel where the fuel flows generally radially outwardly through the media during filtration.

As would be known to someone of ordinary skill in the art, the head includes an inlet for dirty fuel to be filtered by the filter 10, and an outlet for filtered fluid that has been filtered by the filter. The housing 12 can be formed of materials known in the art, including plastic or metal. Returning to FIG. 1, the housing 12 includes a shell 16 that includes an end wall 18 defining a closed end of the shell, and a side wall 20 extending from the end wall. The side wall 20 has an end 22 opposite the end wall 18 that defines an open end of the shell. The end 22 of the side wall includes exterior threads 24 adjacent the open end that are configured to engage with threads on the head to connect the filter to the head. The head and housing 12 described so far are conventional in construction. Further information on spin-on type filter housings and heads can be found in U.S. Pat. Nos. 7,882,961 and 7,614,504, which are incorporated herein by reference in their entirety.

With reference to FIG. 1, the housing 12 defines a filter element chamber 26 and a water sump 28. The filter element chamber is separated from the water sump by a wall 30 that is fixed to the side wall 20 parallel to the end wall 18.

The filter element chamber 26 is sized to receive the filter element 14 therein. The filter element 14 that is disposed in the filter element chamber 26 is configured to separate water from fuel. For example, the filter element 14 can be a concentric filter within a filter configuration, with an outer stage filter 32 that is configured primarily to coalesce water from fuel and also configured to remove fine solid contaminants from the fuel, an inner stage filter 34 that is surrounded by the outer stage filter, and a space 36 between the outer stage filter and the inner stage filter. The inner stage filter is configured to separate coalesced water from the fuel and also remove fine solid contaminants from the fuel. Further information on a concentric filter within a filter configuration designed for fuel water separation that can be used for the filter element 14 is disclosed in U.S. Patent Application Publication No. 2011/0168621 which is incorporated herein by reference in its entirety. However, other types of filter elements including more than two stages or a single stage can be used.

Figure 2:
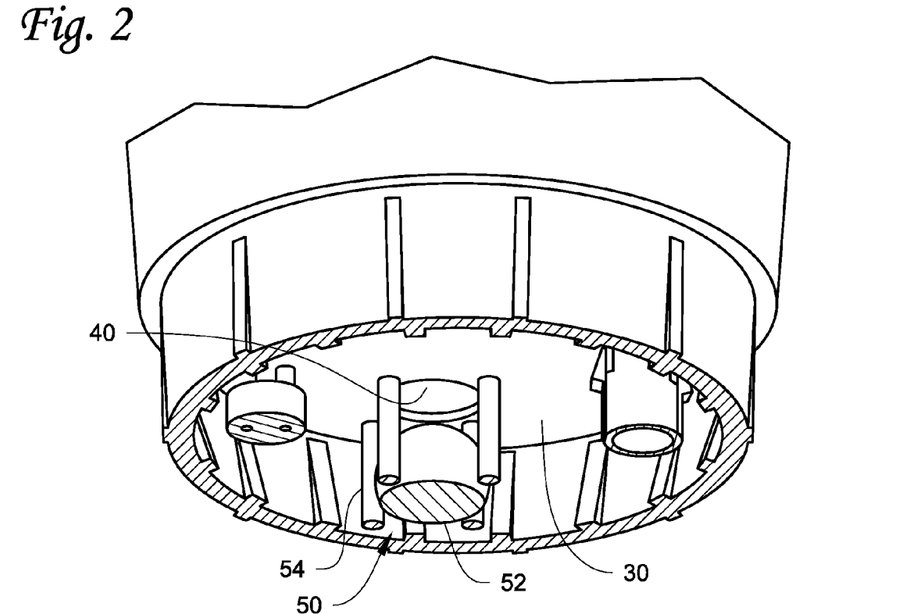
FIG. 2 is a perspective view through a section of the water sump to show the check valve and the wall separating the water sump and the filter element chamber.
Figure 3:
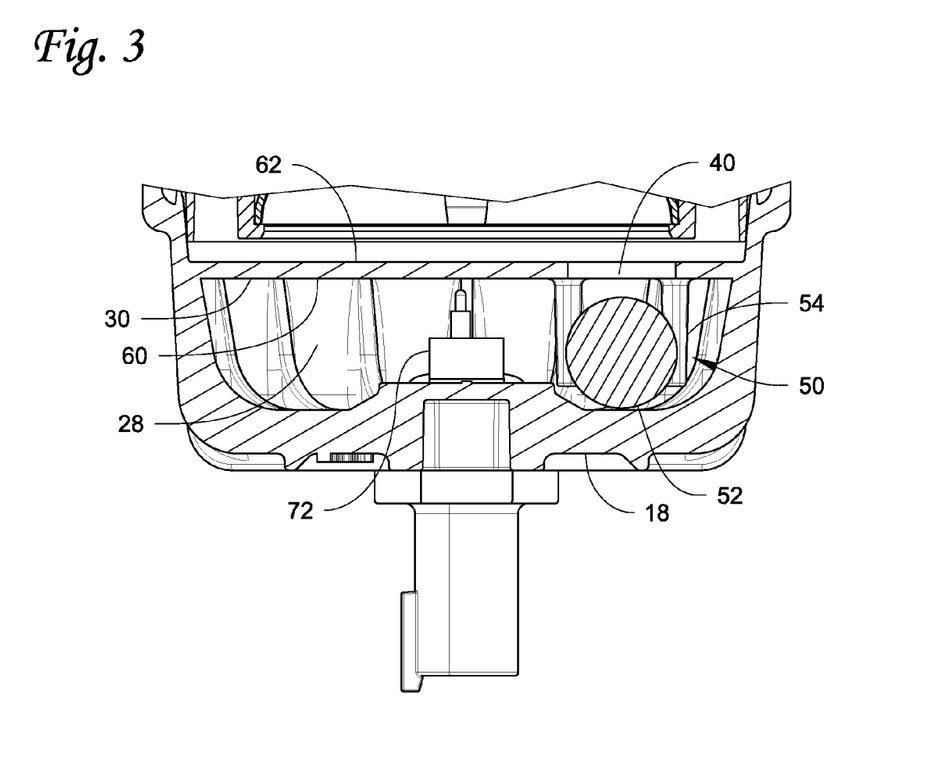
FIG. 3 is a partial cross-sectional view of the FWS filter focusing on the water sump.

With reference to FIGS. 1-3, the wall 30 separates the filter element chamber 26 from the water sump 28. At least one passageway 40 is formed in the wall 30 that fluidly connects the filter element chamber and the water sump. The passageway 40 is the only passage through which water separated by the filter element 14 can flow into the sump 28. The passageway 40 is located in the wall 30 at a radial position corresponding to the space 36 between the outer stage filter 32 and the inner stage filter 34. Therefore, separated water can flow down through the space 36 and through the passageway 40 and into the water sump.

A check valve 50 is disposed in the water sump that controls flow through the passageway 40. The valve has a first, open position (shown in FIGS. 1-4) that permits fluid flow from the filter element chamber into the water sump and a second, closed position (shown in FIGS. 5 and 6) preventing fluid flow between the filter element chamber and the water sump. The valve 50 can be any type and have any configuration that achieves these functions. For example, the valve could be constructed as a plate that closes one or more passageways 40 in the wall 30.

The drawings illustrate a single passageway 40 in the wall 30. However, a plurality of passageways 40 could be formed in the wall 30. Each passageway 40 could be controlled by its own valve, or a single valve could control flow through all of the passageways 40.

In one embodiment, the valve 50 comprises a ball 52 and a cage 54 disposed in the water sump, with the ball being disposed within the cage so that the cage guides the ball between the first position and the second position. As evident from FIG. 3, the wall 30 includes a first surface 60 that faces the water sump 28 and a second surface 62 that faces the filter element chamber 26, and the cage 54 is fixed to the first surface. In the illustrated embodiment, the cage 54 comprises a plurality of posts extending downward from the first surface 60 to ends adjacent to the end wall 18. The ball 52 is held between the posts with the ball being able to travel between an open position shown in FIGS. 1-4 near the end wall and a closed position shown in FIGS. 5-7 where the ball seats within the passageway 40 to close the passageway and prevent fluid flow therethrough.

The ball 52 is selected to have a density that allows it to float on the water that accumulates in the sump 28 but sink in fuel. Since the fluid accumulated in the sump is primarily water (i.e. there could be some trace amounts of fuel in the water in the sump), the ball floats on the water as the water accumulates, until enough water accumulates so that the floating ball closes off the passageway 40 by seating in the passageway. If a valve other than a ball is used, the valve is nonetheless selected so that it can float on the water that accumulates in the sump 28 so as to float upward to close the passageway.

Figure 7:
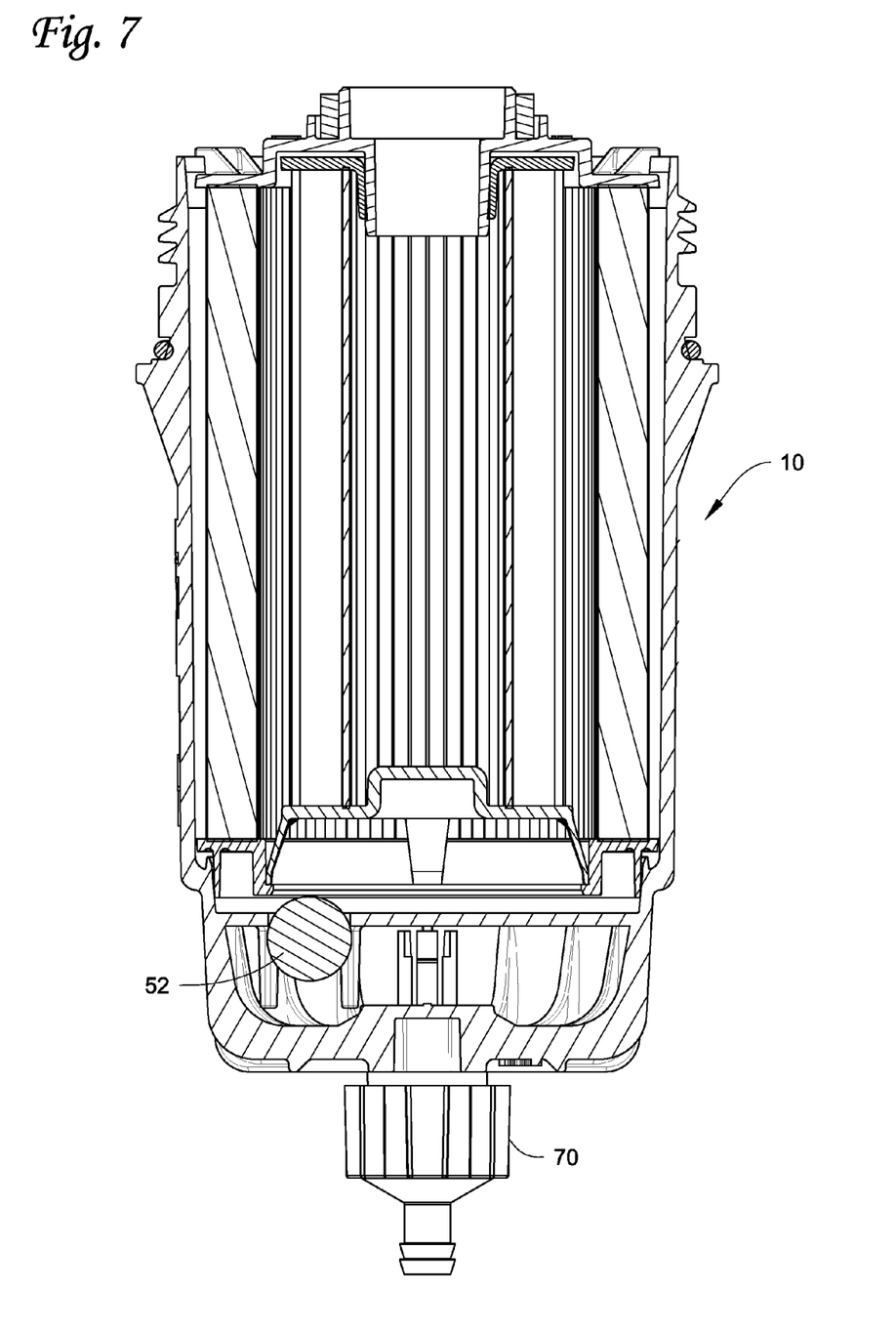
FIG. 7 is a cross-sectional view of the FWS filter showing the drain valve.

With reference to FIG. 7, the end wall 18 includes a water drain valve 70 which, when opened, permits water to be drained from the water sump 28. Any configuration of drain valve can be used as long as the drain valve can be actuated, manually or automatically, between a closed position preventing the draining of water from the sump and an open position allowing the draining of water. The configuration and operation of drain valves in FWS filters is known to those of ordinary skill in the art. In addition, as shown in FIG. 3, a sensor 72 is provided in the sump 28 that detects when enough water has accumulated to send a signal to an operator that the sump should be drained.

Figure 4:
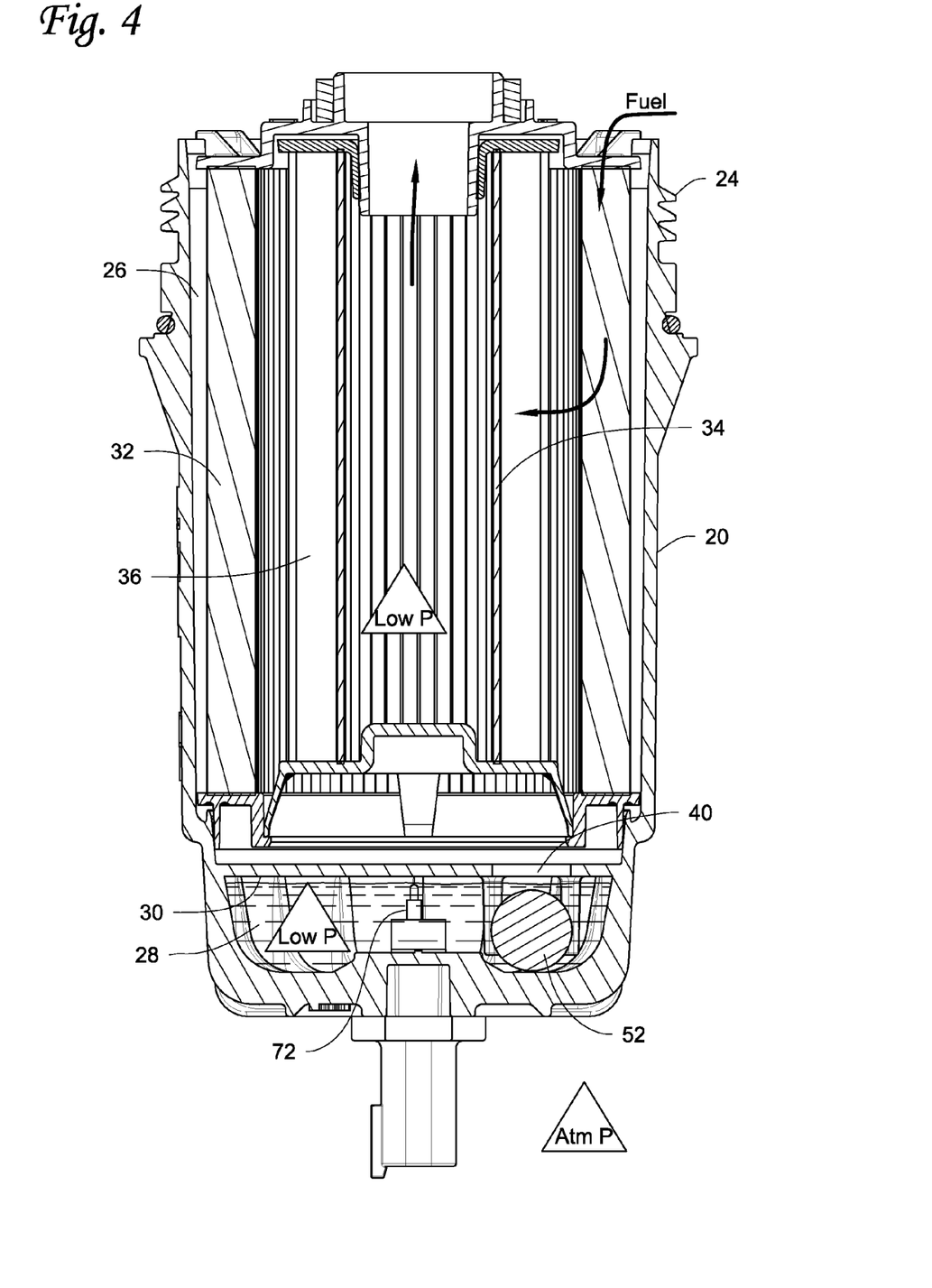
FIG. 4 is a cross-sectional view of the FWS filter showing the flow of fuel and with the drain valve closed.
Figure 5:
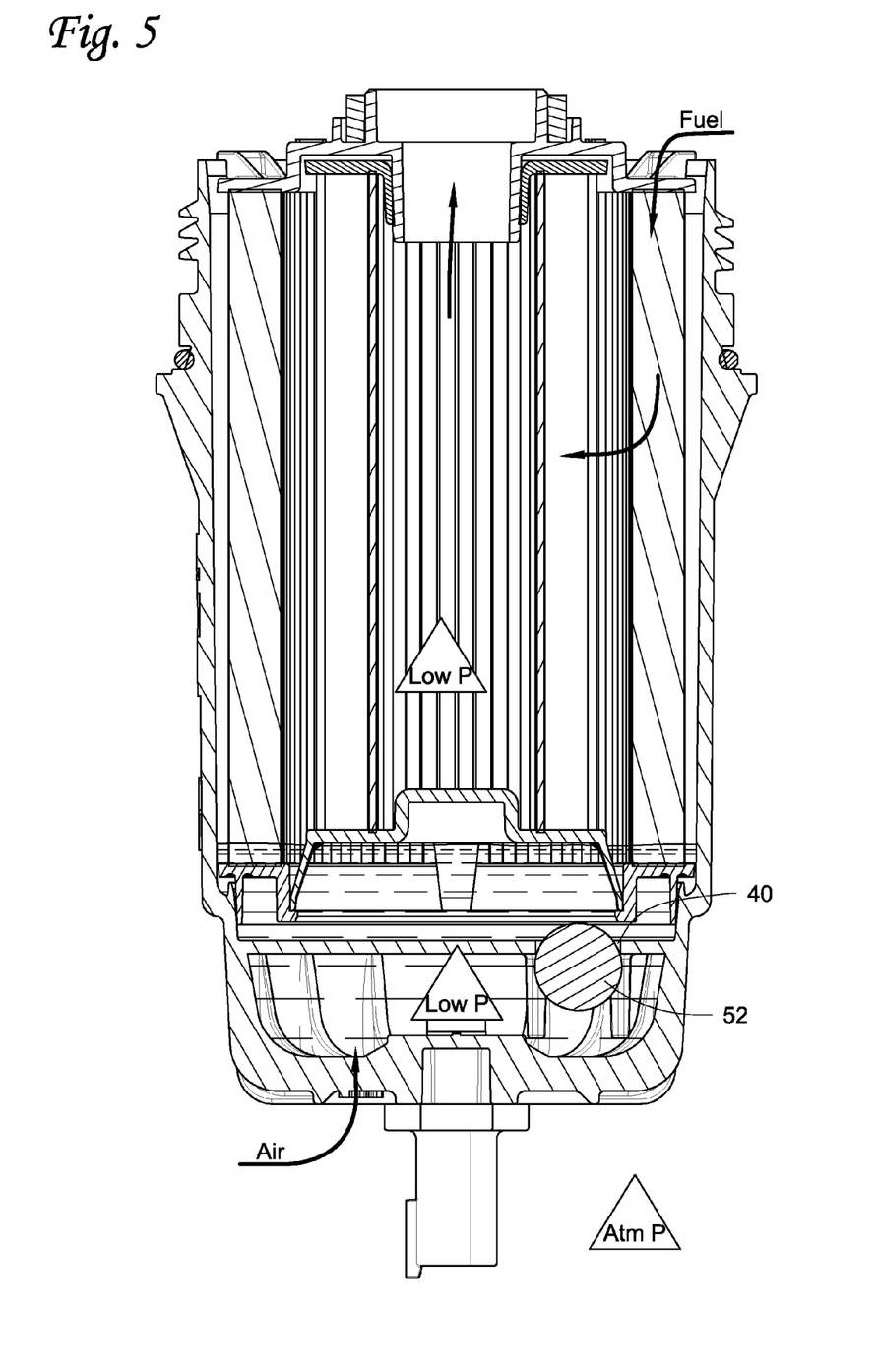
FIG. 5 is a cross-sectional view of the FWS filter when the drain valve is initially opened and the check valve being closed.

The operation of the FWS filter 10 will now be described with reference to FIGS. 4-6. Although not illustrated in the drawings, in use the FWS filter will be connected to a mounting head via the threads 24. With reference initially to FIG. 4, fuel to be filtered that has entered the fuel inlet in the mounting head enters the chamber 26 between the outer stage filter 32 and the inner surface of the side wall 20 as shown by the arrow. The fuel then flows radially inward through the outer stage filter 32 into the space 36. During this time, the outer stage filter 32 removes particulate matter from the fuel and coalesces water contained the fuel. The fuel then flows through the inner stage filter 34. The coalesced water in the fuel is separated by the inner stage filter before entering the inner stage filter media, with the separated water then flowing downward in the space 36 toward the water sump. The inner stage filter also removes fine solid contaminants from the fuel as the fuel flows through the inner stage filter. The now filtered fuel flows into a central interior space of the filter element and flows up and out through a central outlet defined by an endplate of the filter element 14.

The separated water that flows downward in the space 36 flows through the opening(s) 40 and into the sump 28. As indicated in FIG. 4, with the drain valve 70 closed and the valve 50 open, a low pressure (i.e. vacuum) is defined within the central interior space as well as in the water sump, while the outside of the filter is subject to atmospheric pressure. As a result, the separated water can flow downward into the water sump 28 for collection.

Over a period of time of use of the filter, water continues to accumulate in the water sump. FIG. 5 illustrates a state where enough water has accumulated to float the ball upward so that it seats in the passageway 40 to close the passageway. At about the same time, the sensor 72 sends a signal to the operator to drain the sump. When the drain valve 70 is opened, this exposes the water sump to atmospheric pressure while the central interior space of the filter element on the other side of the wall 30 (i.e. the filter element chamber side) remains at low pressure (i.e. vacuum). As a result, water can drain from the sump through the drain valve. At the same time, the low pressure in the filter element space compared to the pressure in the water sump keeps the ball sucked into the passageway 40 to hold the ball in place.

Figure 6:
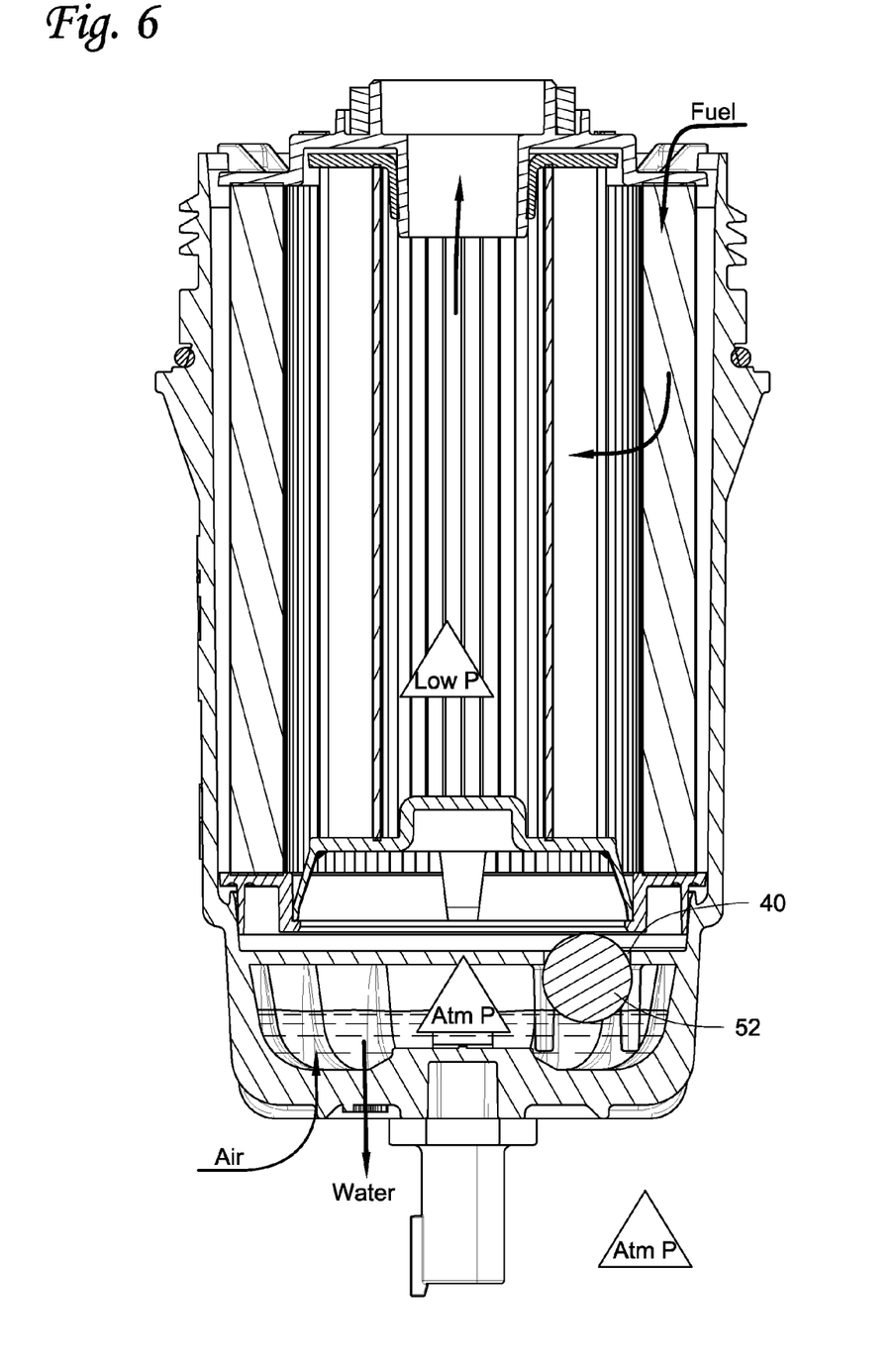
FIG. 6 is a cross-sectional view of the FWS filter with the drain valve opened showing draining of water from the water sump.

FIG. 6 illustrates the drain valve fully opened and water draining from the sump. Atmospheric pressure is present in the water sump while the central interior space remains at low pressure. The ball continues to be held in the closed position in the passageway due to the suction in the central interior space. At the same time, as is illustrated in FIG. 6, fuel to be filtered can continue to flow through the filter. As a result, the filter can remain in operation while draining water from the sump. During this period any water separated by the filter element 14 accumulates at the base of the filter element 14 on the top surface 62 of the wall 30 until the water is drained, the drain valve 70 is closed, and the valve 50 re-opens.

Alternatively, if the water level in the sump is not high enough for the ball to float onto the seat of the passageway, and the drain valve is opened while the engine is running, the vacuum created in the central interior space will suck the ball into the seat of the passageway 40 to close the passageway to permit water to drain from the sump.

Once the water is drained from the sump, the drain valve 70 is closed. Because there is not a perfect seal between the ball and the seat on the passageway 40, the pressures in the filter element space and in the sump will equalize (i.e. the pressure in the sump will return back to low pressure), and the ball will move back down to its first, open position permitting water to again accumulate in the sump.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fuel water separator filter, comprising:
   a filter housing defining a filter element chamber and a water sump, the filter element chamber is separated from the water sump by a wall;
   a coalescing filter element disposed in the filter element chamber, the coalescing filter element configured to separate water from fuel; and
   at least one passageway in the wall that fluidly connects the filter element chamber and the water sump, the at least one passageway being the only passages through which fluid can flow into the water sump, other than atmospheric air via a drain valve,
   flow through each of the at least one fluid passageway being controlled by at least one valve, the at least one valve having a first, open position that permits fluid flow from the filter element chamber into the water sump and a second, closed position preventing fluid flow between the filter element chamber and the water sump;
   the filter housing further includes the drain valve in communication with the water sump to permit draining of water from the water sump; and
   the filter housing further includes an inlet such that all fluid that flows into the inlet flows into the filter element chamber.

2. The fuel water separator filter of claim 1, wherein the coalescing filter element comprises an outer stage filter that is configured to coalesce water from fuel, an inner stage filter that is surrounded by the outer stage filter, and a space between the outer stage filter and the inner stage filter; and the passageway is located in the wall at a position in communication with the space.

3. The fuel water separator filter of claim 1, wherein the at least one valve comprises a ball and a cage disposed in the water sump, the ball is movably disposed within the cage and the cage guides the ball between the first position and the second position.

4. The fuel water separator filter of claim 3, wherein the wall includes a first surface that faces the water sump and a second surface that faces the filter element chamber, and the cage is fixed to the first surface.

5. The fuel water separator filter of claim 1, wherein the fuel water separator filter is a spin-on filter that is configured for detachable connection to a filter head.

6. The fuel water separator filter of claim 1, further comprising a water sensor disposed in the water sump that is configured to detect water.

7. The fuel water separator filter of claim 1, wherein the flow through each of the at least one passageway is controlled by a respective separate valve of the at least one valve.

8. The fuel water separator filter of claim 1, wherein the at least one valve is a single valve that controls the flow through each of the at least one passageway.

9. The fuel water separator filter of claim 1, wherein the at least one passageway is a single passageway.

10. A filter, comprising:
    a filter housing defining a filter element chamber and a water sump, the filter element chamber is separated from the water sump by a wall;
    a coalescing filter element disposed in the filter element chamber, the coalescing filter element configured to separate water from a fluid; and
    at least one passageway in the wall that fluidly connects the filter element chamber and the water sump, the at least one passageway being the only passages through which fluid can flow into the water sump, other than atmospheric air via a drain valve,
    flow through each of the at least one fluid passageway being controlled by at least one valve, the at least one valve having a first, open position that permits flow of water from the filter element chamber into the water sump and a second, closed position preventing flow of water between the filter element chamber and the water sump;
    the filter housing further includes the drain valve in communication with the water sump to permit draining of water from the water sump; and
    the filter housing further includes an inlet such that all fluid that flows into the inlet flows into the filter element chamber.

11. The filter of claim 10, wherein the coalescing filter element comprises an outer stage filter that is configured to coalesce water from the fluid, an inner stage filter that is surrounded by the outer stage filter, and a space between the outer stage filter and the inner stage filter; and the passageway is located in the wall at a position in communication with the space.

12. The filter of claim 10, wherein the at least one valve comprises a ball and a cage disposed in the water sump, the ball is movably disposed within the cage and the cage guides the ball between the first position and the second position.

13. The filter of claim 12, wherein the wall includes a first surface that faces the water sump and a second surface that faces the filter element chamber, and the cage is fixed to the first surface.

14. The filter of claim 10, wherein the filter is a spin-on filter that is configured for detachable connection to a filter head.

15. The filter of claim 10, further comprising a water sensor disposed in the water sump that is configured to detect water.

16. The filter of claim 10, wherein the at least one passageway is a single passageway.

17. A fuel water separator filter, comprising:
   a filter housing defining a filter element chamber and a water sump, the filter element chamber separated from the water sump by a wall;
   a coalescing filter element disposed in the filter element chamber, the coalescing filter element is configured to separate water from fuel and to remove particulate contaminants from the fuel;
   at least one passageway defined in the wall that fluidly connects the filter element chamber and the water sump, the at least one passageway being the only passages through which fluid can flow into the water sump, other than atmospheric air via a drain valve,
   flow through each of the at least one passageway being controlled by at least one valve; and
   the drain valve in communication with the water sump to permit draining of water from the water sump,
   the filter being configured to permit water to be drained from the water sump via the drain valve without shutting off fuel flow to the filter and while the filter element filters the fuel, and
   the filter housing further includes an inlet such that all fluid that flows into the inlet flows into the filter element chamber.

18. The fuel water separator filter of claim 17, wherein the at least one valve has a first, open position that permits fluid flow from the filter element chamber into the water sump and a second, closed position preventing fluid flow between the filter element chamber and the water sump.

19. The fuel water separator filter of claim 18, wherein the coalescing filter element comprises an outer stage filter that is configured to coalesce water from fuel, an inner stage filter that is surrounded by the outer stage filter, and a space between the outer stage filter and the inner stage filter; and the passageway is located in the wall at a position in communication with the space.

20. The fuel water separator filter of claim 18, wherein the at least one valve comprises a ball and a cage disposed in the water sump, the ball is movably disposed within the cage and the cage guides the ball between the first position and the second position.

21. The fuel water separator filter of claim 20, wherein the wall includes a first surface that faces the water sump and a second surface that faces the filter element chamber, and the cage is fixed to the first surface.

22. The fuel water separator filter of claim 17, wherein the at least one passageway is a single passageway.

\* \* \* \* \*